US011363074B2

(12) United States Patent
Shah et al.

(10) Patent No.: US 11,363,074 B2
(45) Date of Patent: Jun. 14, 2022

(54) METHOD AND SYSTEM FOR HANDLING MISSION CRITICAL DATA (MCDATA) COMMUNICATIONS USING PRE-ESTABLISHED SESSION

(71) Applicant: SAMSUNG ELECTRONICS CO., LTD., Suwon-si (KR)

(72) Inventors: Sapan Pramodkumar Shah, Karnataka (IN); Basavaraj Jayawant Pattan, Karnataka (IN); Nishant Gupta, Karnataka (IN); Siva Prasad Gundur, Karnataka (IN); Vijay Sangameshwara, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/030,988

(22) Filed: Sep. 24, 2020

(65) Prior Publication Data
US 2021/0099496 A1    Apr. 1, 2021

(30) Foreign Application Priority Data

Sep. 26, 2019  (IN) .............................. 201941039029
Apr. 8, 2020   (IN) .............................. 201941039029

(51) Int. Cl.
*H04L 65/1069*  (2022.01)
*H04L 65/10*    (2022.01)
*H04W 4/10*     (2009.01)

(52) U.S. Cl.
CPC ...... *H04L 65/1006* (2013.01); *H04L 65/1069* (2013.01); *H04W 4/10* (2013.01)

(58) Field of Classification Search
CPC ............. H04L 65/1006; H04L 65/1069; H04L 41/0803; H04L 67/14; H04L 67/18; H04W 4/10; H04W 4/08; H04W 4/21
(Continued)

(56) References Cited

U.S. PATENT DOCUMENTS

2006/0230168 A1* 10/2006 Sung ....................... H04W 4/08
                                                    709/230
2008/0248763 A1* 10/2008 Park .................... H04L 65/1006
                                                    455/90.2
(Continued)

FOREIGN PATENT DOCUMENTS

WO    2016/039579    3/2016
WO    2016/111528    7/2016

OTHER PUBLICATIONS

International Search Report dated Dec. 23, 2020 in corresponding International Application No. PCT/KR2020/013005.
(Continued)

*Primary Examiner* — Glenford J Madamba
(74) *Attorney, Agent, or Firm* — Nixon & Vanderhye P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Example embodiments initiate a Mission Critical data (MCData) communication using a pre-established session. A participating MCData server receives at least one pre-established session setup request from an originating MCData client device. The pre-established session setup request comprises the pre-established session indication advising the participating MCData server of initiation of at least one pre-established session. The participating MCData server initiates the at least one pre-established session with the originating MCData client device based on the pre-established session indication. The participating MCData (Continued)

server sends at least one MCData-communication-state message to the originating MCData client device.

10 Claims, 8 Drawing Sheets

(58) Field of Classification Search
    USPC .......................................................... 709/227
    See application file for complete search history.

(56) References Cited

U.S. PATENT DOCUMENTS

| | | | |
|---|---|---|---|
| 2013/0155875 A1 | 6/2013 | Ayyasamy et al. | |
| 2013/0315164 A1* | 11/2013 | Arur | H04W 4/10 |
| | | | 370/329 |
| 2017/0171732 A1 | 6/2017 | Dao et al. | |
| 2017/0289776 A1 | 10/2017 | Kim et al. | |
| 2018/0160277 A1* | 6/2018 | Patel | H04W 4/10 |
| 2019/0199666 A1 | 6/2019 | Pattan et al. | |

OTHER PUBLICATIONS

European Search Report and Written Opinion dated Jan. 28, 2021 in corresponding European Application No. 20198361.6.
"3GPP; TSG CT; Mission Critical Push To Talk (MCPTT) call control; Protocol specification (Release 16)", 3GPP TS 24.379 V16.2.0, Sep. 24, 2019 sections 6.3-8.1.
Open Mobile Alliance: "Push to talk over Cellular (PoC)—Architecture, Candidate Version 1.0", Internet Citation, Mar. 17, 2005 (Mar. 17, 2005), XP002344470, Retrieved from the Internet:URL: http://member.openmobilealliance.org/fts/Public_documents/POC/PermanenCdocuments/OMA-AO-PoC-V1_0-20050317-C.zip [retrieved on Sep. 9, 2005].
Office Action for IN Application No. 201941039029 dated Nov. 3, 2021, 6 pages.

* cited by examiner

METHOD AND SYSTEM FOR HANDLING MISSION CRITICAL DATA (MCDATA) COMMUNICATIONS USING PRE-ESTABLISHED SESSION

CROSS-REFERENCE TO RELATED APPLICATIONS

This application is based on and claims priority under 35 U.S.C. § 119 to Indian Provisional Patent Application Number 201941039029, filed on Sep. 26, 2019, in the Indian Patent Office, and Indian Non-Provisional Patent Application Number 201941039029, filed on Apr. 8, 2020, in the Indian Patent Office, the disclosures of which are incorporated by reference herein in their entireties.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the 3GPP specification TS 24.282, when a Mission Critical Data (MCData) client initiates a pre-established session with a participating MCData function, the participating MCData function does not have any way to distinguish a pre-established session setup request compared to other on-demand session setup requests.

Further, once the pre-established session is set up and the MCData client initiates the MCData communication using the pre-established session, the MCData client needs to know whether the session setup is successful or failed. But there is no existing system that shares the state of the MCData communication from the participating MCData function to the MCData client. Further, once the pre-established session is set up and if the participating MCData function decides to use it for requesting any incoming call, there is no existing system for the participating MCData function to request an incoming session setup to the MCData client.

Further, once an MCData communication is initiated using a pre-established session, the MCData client may terminate the MCData communication (keeping the pre-established session active). However, there is no existing system that informs the termination status of the MCData communication using the pre-established session. Further, after initiating an MCData communication using a pre-established session, a remote MCData client may terminate MCData communication. But there is no existing system that informs the MCData client of the termination request of the MCData communication using the pre-established session.

Thus, it is desirable to address the above mentioned disadvantages or other shortcomings or at least provide a useful alternative.

SUMMARY

Embodiments of the disclosure provide a method for initiating a Mission Critical data (MCData) communication using a pre-established session.

Embodiments of the disclosure provide a method and apparatus to receive at least one pre-established session setup request from an originating MCData client device, where the pre-established session setup request comprises a pre-established session indication informing a participating MCData server of the initiation of at least one pre-established session.

Embodiments of the disclosure provide a method and apparatus to receive at least one MCData-communication-state message from the participating MCData server using the at least one pre-established session.

Embodiments of the disclosure provide a method for initiating a Mission Critical data (MCData) communication using a pre-established session.

According to an example embodiment, a method includes receiving, by a participating MCData server, at least one pre-established session setup request message from an originating MCData client device. The pre-established session setup request message comprises a pre-established session indication informing the participating MCData server about the initiation of at least one pre-established session. Further, the method includes initiating, by the participating MCData server, at least one pre-established session with the originating MCData client device based on the pre-established session indication. Further, the method includes sending, by the participating MCData server, at least one MCData-communication-state message to the originating MCData client device.

In an example embodiment, the method further includes receiving, by the participating MCData server, an MCData communication "refer request" message from the originating MCData client device to establish an MCData communication session towards a controlling MCData server. Further, the method includes sending, by the participating MCData server, an acknowledgement to the originating MCData client device in response to receiving the MCData communication refer request message. Further, the method includes sending, by the participating MCData server, an MCData communication "invite request" message to the controlling MCData server to establish the MCData communication session with the originating MCData client device. Further, the method includes receiving, by the participating MCData server, one of: an MCData communication session establishment successful message, an MCData communication session failure message, and an MCData communication session reject message from the controlling MCData server.

In an example embodiment, the method further includes performing, by the participating MCData server, one of: (i) sending a first MCData-communication-state message to the originating MCData client device in response to receiving the MCData communication session establishment successful message from the controlling MCData server, where the first MCData-communication-state message comprises an establish-success indication indicating that the MCData communication is established successfully within the pre-established session, (ii) sending a second MCData-communication-state message to the originating MCData client device in response to receiving the MCData communication session failure message from the controlling MCData server, where the second MCData-communication-state message comprises an establish-fail indication indicating that the MCData communication is not established successfully within the pre-established session, (iii) sending a third MCData-communication-state message to the originating MCData client device in response to receiving the MCData communication session reject message from the controlling MCData server, where the third MCData-communication-state message comprises the establish-fail indication indicating that the MCData communication is not established successfully within the pre-established session.

In an example embodiment, the method further includes receiving, by the participating MCData server, an acknowledgement message from the originating MCData client device in response to at least one of the first MCData-communication-state message and the second MCData-communication-state message. Further, the method includes retaining, by the participating MCData server, the at least one pre-established session with the originating MCData client device.

In an example embodiment, the method further includes receiving, by the participating MCData server, an MCData communication end request message from the originating MCData client device to terminate the MCData communication session towards the controlling MCData server. Further, the method includes sending, by the participating MCData server, an acknowledgement message to the originating MCData client device in response to receiving the MCData communication end request message. Further, the method includes sending, by the participating MCData server, the MCData communication end request message towards the controlling MCData server to terminate the MCData communication session with the originating MCData client device. Further, the method includes receiving, by the participating MCData server, an MCData communication session terminate message from the controlling MCData server.

According to an example embodiment, the method includes sending, by the participating MCData server, an MCData-communication-state message to the originating MCData client device in response to receiving the MCData communication session terminate message from the controlling MCData server, where the MCData-communication-state message comprises a terminated indication indicating that the MCData communication is terminated successfully within the pre-established session. Further, the method includes receiving, by the participating MCData server, an acknowledgement message from the originating MCData client device in response to receiving the MCData-communication-state. Further, the method includes retaining, by the participating MCData server, the at least one pre-established session with the originating MCData client device.

In an example embodiment, the method further includes receiving, by the participating MCData server, an MCData communication invite message request from a controlling MCData server to establish the MCData communication session with the originating MCData client device. Further, the method includes sending, by the participating MCData server, an MCData-communication-state message to the originating MCData client device in response to receiving the MCData communication invite message request from the controlling MCData server, where the MCData-communication-state message comprises an establish-request indication indicating that the request is to establish MCData communication within the pre-established session. Further, the method includes receiving, by the participating MCData server, an acknowledgement message from the originating MCData client device in response to the MCData-communication-state. Further, the method includes sending, by the participating MCData server, the acknowledgement message towards the controlling MCData server in response to receiving the acknowledgement message. Further, the method includes retaining, by the participating MCData server, the at least one pre-established session with the originating MCData client device.

In an example embodiment, the method further includes receiving, by the participating MCData server, an MCData communication end request message from the controlling MCData server to terminate the MCData communication session with the originating MCData client device. Further, the method includes sending, by the participating MCData server, an MCData-communication-state message to the originating MCData client device in response to receiving the MCData communication end request message from the controlling MCData server, where the MCData-communication-state message comprises a terminate-request indication to terminate MCData communication within the pre-established session. Further, the method includes receiving, by the participating MCData server, an acknowledgement message from the originating MCData client device in response to the MCData-communication-state. Further, the method includes sending, by the participating MCData server, the acknowledgement message towards the controlling MCData server in response to receiving the acknowledgement message. Further, the method includes retaining, by the participating MCData server, the at least one pre-established session with the originating MCData client device.

Accordingly, the embodiments herein provide a participating Mission Critical data (MCData) server for initiating an MCData communication using a pre-established session. The participating MCData server includes a processor coupled with a memory, and a communicator. The processor is configured to receive at least one pre-established session setup request message from an originating MCData client device, where the pre-established session setup request message comprises the pre-established session indication informing the participating MCData server of initiation of at least one pre-established session. Further, the processor is configured to initiate the at least one pre-established session with the originating MCData client device based on the pre-established session indication. Further, the processor is configured to send the at least one MCData-communication-state message to the originating MCData client device.

These and other aspects of the embodiments herein will be better appreciated and understood when considered in conjunction with the following description and the accompanying drawings. It should be understood, however, that the following descriptions, while indicating example embodiments and various example details thereof, are provided by way of illustration and not limitation. Many changes and modifications may be made within the scope of the embodiments herein without departing from the spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
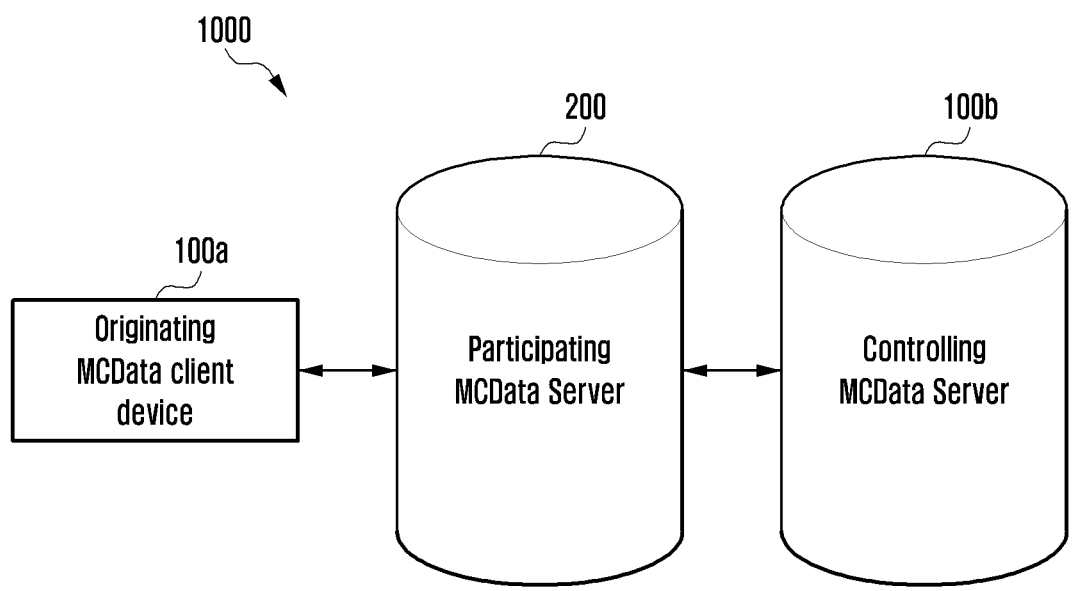
FIG. 1 is a block diagram illustrating an example system to initiate a Mission Critical data (MCData) communication using a pre-established session, according to an embodiment.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

In the present disclosure, various embodiments are adopted from the 3GPP specification TS 24.282 (v16.4.1). The terms 'MCData client', 'MCData user' is 'originating MCData client device', a term 'participating MCData function' is 'participating MCData server', and a term 'controlling MCData function' is 'controlling MCData server'.

Accordingly, example embodiments herein disclose a method for initiating a Mission Critical data (MCData) communication using a pre-established session. The method includes receiving, by a participating MCData server, at least one pre-established session setup request message from an originating MCData client device. The pre-established session setup request comprises the pre-established session indication informing the participating MCData server of initiation of at least one pre-established session. Further, the method includes initiating, by the participating MCData server, at least one pre-established session with the originating MCData client device based on the pre-established session indication. Further, the method includes sending, by the participating MCData server, at least one MCData-communication-state message to the originating MCData client device.

Referring now to the drawings, and more particularly to FIGS. 1 through 8, there are shown example embodiments.

FIG. 1 illustrates a block diagram of a system (1000) to initiate a MCData communication using a pre-established session, according to an example embodiment as disclosed herein. In an example embodiment, the system (1000)

includes an originating MCData client device (100a), a controlling MCData server (100b), and an participating MCData server (200).

The participating MCData server (200) receives at least one pre-established session setup request (i.e. INVITE message) from the originating MCData client device (100a). The pre-established session setup request comprises the pre-established session indication informing the participating MCData server (200) of initiation of at least one pre-established session. Further, the participating MCData server (200) initiates the at least one pre-established session with the originating MCData client device (100a) based on the pre-established session indication.

Further, the participating MCData server (200) receives an MCData communication refer request (i.e. REFER (method=INVITE) (private/group)) message from the originating MCData client device (100a) to establish an MCData communication session towards a controlling MCData server (100b). Further, the participating MCData server (200) sends an acknowledgement (i.e. 200 OK) to the originating MCData client device (100a) in response to receiving the MCData communication refer request message. Further, the participating MCData server (200) sends an MCData communication invite request message (i.e. INVITE message) towards the controlling MCData server (100b) to establish the MCData communication session with the originating MCData client device (100a). Further, the participating MCData server (200) receives one of an MCData communication session establishment successful message (i.e. establish-success), an MCData communication session failure message (i.e. establish-fail), and an MCData communication session reject message (i.e. establish-fail) from the controlling MCData server (100b).

Further, the participating MCData server (200) sends a MCData-communication-state message to the originating MCData client device (100a) in response to receiving the MCData communication session establishment successful message from the controlling MCData server (100b), where the MCData-communication-state message comprises an establish-success indication indicating that the MCData communication is established successfully within the pre-established session.

Further, the participating MCData server (200) sends a MCData-communication-state message to the originating MCData client device (100a) in response to receiving the MCData communication session failure message from the controlling MCData server (100b), where the MCData-communication-state message comprises an establish-fail indication indicating that the MCData communication is not established successfully within the pre-established session.

Further, the participating MCData server (200) sends a MCData-communication-state message to the originating MCData client device (100a) in response to receiving the MCData communication session reject message from the controlling MCData server (100b), where the MCData-communication-state message comprises the establish-fail indication indicating that the MCData communication is not established successfully within the pre-established session.

Further, the participating MCData server (200) receives an acknowledgement message (i.e. 200 OK) from the originating MCData client device (100a) in response to the at least one MCData-communication-state. Further, the participating MCData server (200) retains at least one pre-established session with the originating MCData client device (100a).

Further, the participating MCData server (200) receives an MCData communication end request message (i.e. REFER (method=BYE)) from the originating MCData client device (100a) to terminate the MCData communication session towards the controlling MCData server (100b). Further, the participating MCData server (200) sends an acknowledgement message (i.e. 200 OK) to the originating MCData client device (100a) in response to receiving the MCData communication end request message. Further, the participating MCData server (200) sends the MCData communication end request message (i.e. BYE message) towards the controlling MCData server (100b) to terminate the MCData communication session with the originating MCData client device (100a). Further, the participating MCData server (200) receives an MCData communication session terminate message from the controlling MCData server (100b). Further, the participating MCData server (200) sends a MCData-communication-state message (i.e. Re-INVITE (with communication state="terminated")) to the originating MCData client device (100a) in response to receiving the MCData communication session terminate message from the controlling MCData server (100b). The MCData-communication-state message comprises a terminated indication indicating that the MCData communication is terminated successfully within the pre-established session. Further, the participating MCData server (200) receives an acknowledgement message (i.e. 200 OK) from the originating MCData client device (100a) in response to receiving the MCData-communication-state. Further, the participating MCData server (200) retains the at least one pre-established session with the originating MCData client device (100a).

Further, the participating MCData server (200) receives an MCData communication invite message request (i.e. INVITE message) from a controlling MCData server (100b) to establish an MCData communication session with the originating MCData client device (100a). Further, the participating MCData server (200) sends a MCData-communication-state message (i.e. Re-INVITE (with communication state="establish-request")) to the originating MCData client device (100a) in response to receiving the MCData communication invite message request from the controlling MCData server (100b). The MCData-communication-state message comprises an establish-request indication indicating that the request is to establish MCData communication within the pre-established session. Further, the participating MCData server (200) receives an acknowledgement message (i.e. 200 OK) from the originating MCData client device (100a) in response to the MCData-communication-state. Further, the participating MCData server (200) sends the acknowledgement message to the controlling MCData server (100b) in response to receiving the acknowledgement message. Further, the participating MCData server (200) retains the at least one pre-established session with the originating MCData client device (100a).

Further, the participating MCData server (200) receives an MCData communication end request message (i.e. BYE message) from the controlling MCData server (100b) to terminate the MCData communication session towards the controlling MCData server (100b). Further, the participating MCData server (200) sends a MCData-communication-state message (i.e. Re-INVITE (with communication state="terminate-request")) to the originating MCData client device (100a) in response to receiving the MCData communication end request message from the controlling MCData server (100b), where the MCData-communication-state message comprises a terminate-request indication indicating that the request is to terminate MCData communication within the pre-established session. Further, the participating MCData server (200) receives an acknowledgement message (i.e. 200 OK) from the originating MCData client device (100a) in response to the MCData-communication-state. Further, the participating MCData server (200) sends the acknowledgement message to the controlling MCData server (100b) in response to receiving the acknowledgement message. Further, the participating MCData server (200) retains the at least one pre-established session with the originating MCData client device (100a).

Figure 2:
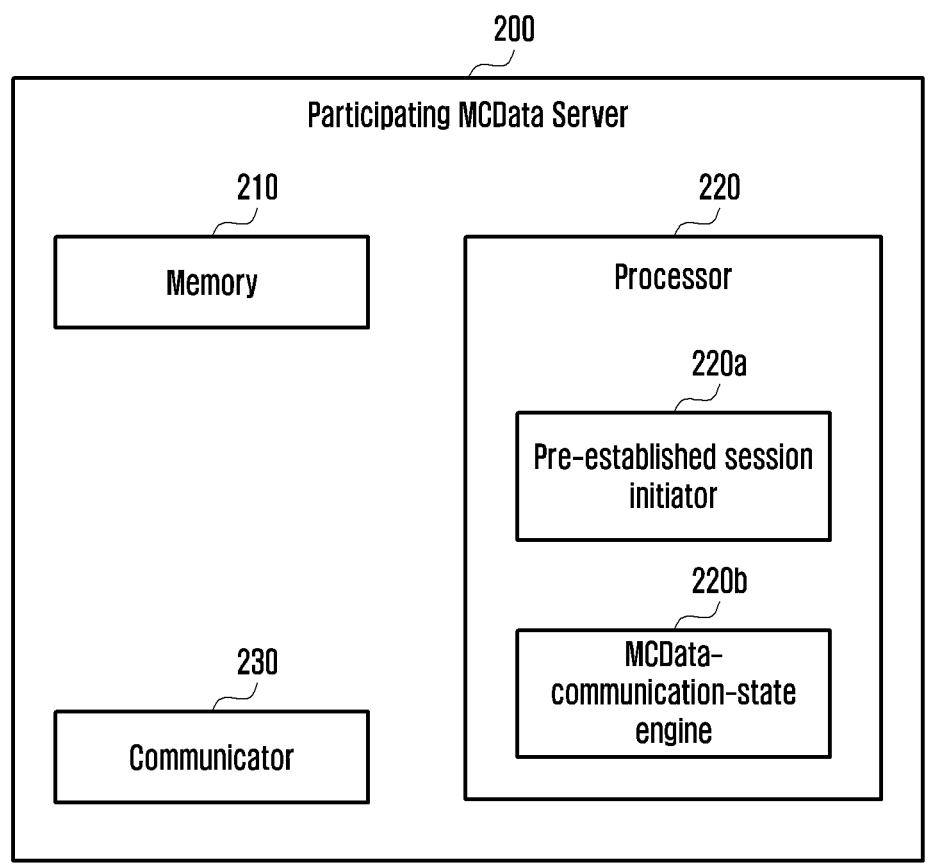
FIG. 2 is a block diagram illustrating an example participating MCData server for initiating the MCData communication using the pre-established session, according to an embodiment.

FIG. 2 is a block diagram of the participating MCData server (200) for initiating the MCData communication using the pre-established session, according to an example embodiment as disclosed herein. The participating MCData server (200) includes a memory (210), a processor (220), and a communicator (230), e.g., communications interface circuitry.

The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in Random Access Memory (RAM) or cache). In an example embodiment, the memory (210) can be an internal storage unit or it can be an external storage unit of the participating MCData server (200), cloud storage, or any other type of external storage.

In an example embodiment, the processor (220) includes a pre-established session initiator (220a) and an MCData communication-state engine (220b), each of which may be implemented with hardware circuitry and/or program instructions executed by the processor (220).

The pre-established session initiator (220a) receives the at least one pre-established session setup request (i.e. INVITE message) from the originating MCData client device (100a). The pre-established session setup request comprises the pre-established session indication indicating the pre-established session initiator (220a) about initiation of at least one pre-established session. Further, the pre-established session initiator (220a) initiates the at least one pre-established session with the originating MCData client device (100a) based on the pre-established session indication.

The MCData communication-state engine (220b) receives the MCData communication refer request (i.e. REFER (method=INVITE) (private/group)) message from the originating MCData client device (100a) to establish the MCData communication session with the controlling MCData server (100b). Further, the MCData communication-state engine (220b) sends an acknowledgement (i.e. 200 OK) to the originating MCData client device (100a) in response to receiving the MCData communication refer request message. Further, the MCData communication-state engine (220b) sends the MCData communication invite request message (i.e. INVITE message) towards the controlling MCData server (100b) to establish the MCData communication session with the originating MCData client device (100a). Further, the MCData communication-state engine (220b) receives one of the MCData communication session establishment successful message (i.e. establish-success), the MCData communication session failure message (i.e. establish-fail), and the MCData communication session reject message (i.e. establish-fail) from the controlling MCData server (100b).

Further, the MCData communication-state engine (220b) sends the MCData-communication-state message to the originating MCData client device (100a) in response to receiving the MCData communication session establishment successful message from the controlling MCData server (100b), where the MCData-communication-state message comprises an establish-success indication indicating that the MCData communication is established successfully within the pre-established session.

Further, the MCData communication-state engine (220b) sends the MCData-communication-state message to the originating MCData client device (100a) in response to receiving the MCData communication session failure message from the controlling MCData server (100b), where the MCData-communication-state message comprises an establish-fail indication indicating that the MCData communication is not established successfully within the pre-established session.

Further, the MCData communication-state engine (220b) sends the MCData-communication-state message to the originating MCData client device (100a) in response to receiving the MCData communication session reject message from the controlling MCData server (100b), where the MCData-communication-state message comprises the establish-fail indication indicating that the MCData communication is not established successfully within the pre-established session.

Further, the MCData communication-state engine (220b) receives an acknowledgement message (i.e. 200 OK) from the originating MCData client device (100a) in response to the at least one MCData-communication-state. Further, the MCData communication-state engine (220b) retains at least one pre-established session with the originating MCData client device (100a).

Further, the MCData communication-state engine (220b) receives the MCData communication end request message (i.e. REFER (method=BYE) message) from the originating MCData client device (100a) to terminate the MCData communication session towards the controlling MCData server (100b). Further, the MCData communication-state engine (220b) sends an acknowledgement message (i.e. 200 OK) to the originating MCData client device (100a) in response to receiving the MCData communication end request message. Further, the MCData communication-state engine (220b) sends the MCData communication end request message (i.e. BYE message) towards the controlling MCData server (100b) to terminate the MCData communication session with the originating MCData client device (100a).

Further, the MCData communication-state engine (220b) receives the MCData communication session terminate message from the controlling MCData server (100b). Further, the MCData communication-state engine (220b) sends the MCData-communication-state message (i.e. Re-INVITE (with communication state="terminated")) to the originating MCData client device (100a) in response to receiving the MCData communication session terminate message from the controlling MCData server (100b), where the MCData-communication-state message comprises the terminated indication indicating that the MCData communication is terminated successfully within the pre-established session. Further, the MCData communication-state engine (220b)

receives an acknowledgement message (i.e. 200 OK) from the originating MCData client device (100a) in response to receiving the MCData-communication-state. Further, the MCData communication-state engine (220b) retains the at least one pre-established session with the originating MCData client device (100a).

Further, the MCData communication-state engine (220b) receives the MCData communication invite message request (i.e. INVITE message) from the controlling MCData server (100b) to establish the MCData communication session with the originating MCData client device (100a). Further, the MCData communication-state engine (220b) sends a MCData-communication-state message (i.e. Re-INVITE (with communication state="establish-request")) to the originating MCData client device (100a) in response to receiving the MCData communication invite message request from the controlling MCData server (100b), where the MCData-communication-state message comprises the establish-request indication indicating that the MCData communication is established successfully within the pre-established session.

Further, the MCData communication-state engine (220b) receives an acknowledgement message (i.e. 200 OK) from the originating MCData client device (100a) in response to the MCData-communication-state. Further, the MCData communication-state engine (220b) sends the acknowledgement message to the controlling MCData server (100b) in response to receiving the acknowledgement message. Further, the MCData communication-state engine (220b) retains the at least one pre-established session with the originating MCData client device (100a).

Further, the MCData communication-state engine (220b) receives the MCData communication end request message (i.e. BYE message) from the controlling MCData server (100b) to terminate the MCData communication session with the controlling MCData server (100b). Further, the MCData communication-state engine (220b) sends the MCData-communication-state message (i.e. Re-INVITE (with communication state="terminate-request")) to the originating MCData client device (100a) in response to receiving the MCData communication end request message from the controlling MCData server (100b), where the MCData-communication-state message comprises the terminate-request indication indicating that the request is to terminate MCData communication within the pre-established session. Further, the MCData communication-state engine (220b) receives an acknowledgement message (i.e. 200 OK) from the originating MCData client device (100a) in response to the MCData-communication-state. Further, the MCData communication-state engine (220b) sends the acknowledgement message to the controlling MCData server (100b) in response to receiving the acknowledgement message. Further, the MCData communication-state engine (220b) retains the at least one pre-established session with the originating MCData client device (100a).

The communicator (230) is configured for communicating internally between internal hardware components and with external devices via one or more networks.

Although FIG. 2 shows various hardware components of the participating MCData server (200) but it is to be understood that other example embodiments are not limited thereon. In other example embodiments, the participating MCData server (200) may include less or more components. Further, the labels or names of the components are used only for illustrative purpose and does not limit the scope of the disclosure. One or more components can be combined together to perform the same or substantially similar function to initiate the MCData communication using the pre-established session.

Figure 3:
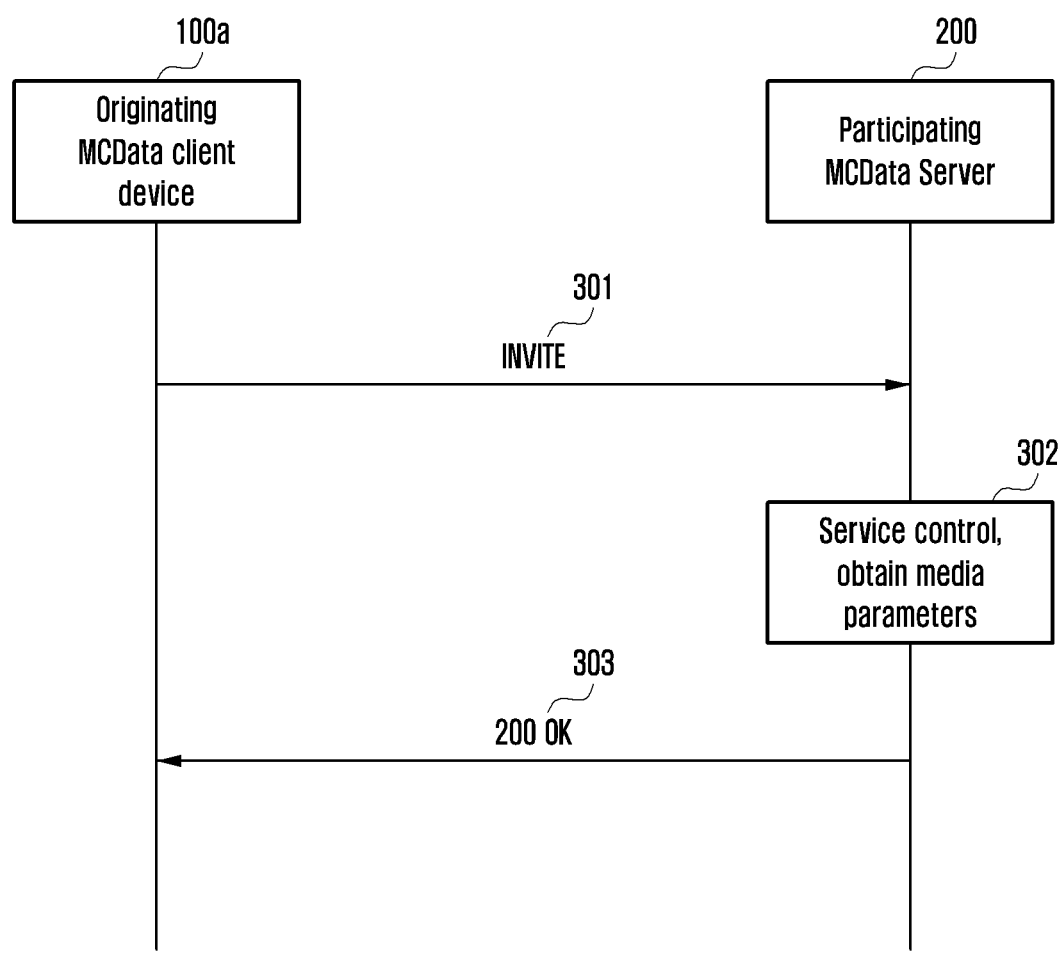
FIG. 3 is a sequence diagram illustrating an example method for setting-up the pre-establish session within the MCData communication, according to an embodiment.

FIG. 3 is a sequence diagram illustrating a method for setting-up the pre-establish session within the MCData communication, according to an example embodiment as disclosed herein.

At step-301, the participating MCData server (200) receives at least one pre-established session setup request (i.e. INVITE) from the originating MCData client device (100a), where the pre-established session setup request comprises the pre-established session indication informing the participating MCData server (200) of initiation of at least one pre-established session. At step-302, the participating MCData server (200) sets up service control and obtains media parameter(s). At step-303, the participating MCData server (200) sends an acknowledgement (i.e. 200 OK) to the originating MCData client device (100a) in response to receiving the at least one pre-established session setup request.

According to sub-clause 18.1 of 3GPP TS 24.282: the originating MCData client device (100a) may establish one or more pre-established sessions to the participating MCData server (200) at any time after session initiation protocol (SIP) registration and setting the service settings. The originating MCData client device (100a) may use the pre-established session for originating standalone short data service (SDS) using media plane, SDS session or file distribution (FD) using media plane after pre-established session establishment. The participating MCData server (200) may use the pre-established session for terminating standalone SDS using media plane, SDS session or FD using media plane after pre-established session establishment. The use of the pre-established session requires the use of resource sharing as specified in 3GPP TS 29.214 and 3GPP TS 24.229 by the participating MCData server (200). The participating MCData server (200) use of resource sharing is defined in sub-clause 18.2 of 3GPP TS 24.282.

According to sub-clause 18.2: participating MCData server (200) use of resource sharing: the participating MCData server (200) utilizes resource sharing either:

1) Via the SIP core as specified in 3GPP TS 24.229; or
2) By directly interfacing to Policy and Charging Control (PCC) to control resource sharing via the Rx reference point as specified in 3GPP TS 29.214.

If resource sharing is supported then the participating MCData server (200) may allow the use of pre-established sessions by the originating MCData client device (100a). The participating MCData server (200) can determine that the SIP core supports resource sharing from the received third-party SIP REGISTER request if the Resource-Share header field with the value "supported" is contained in the "message/sip" MIME body of the third-party SIP REGISTER request as specified in 3GPP TS 24.229. When using resource sharing the participating MCData server (200) uses the "+g.3gpp.registration-token" header field parameter in the Contact header field of the third-party REGISTER request to identify the MCData UE (e.g. originator UE or remote UE) that is registering and to identify whether resource sharing and pre-established sessions can be used with a specific MCData UE.

According to sub-clause 18.3.1 of 3GPP TS 24.282: the sub-clause describes the procedures to establish pre-established MCData session which may be used for originating standalone SDS using media plane or SDS session. The originating MCData client device (100a) or the participating MCData server (200) may initiate the release of the pre-established session as defined in sub-clause 18.3.3.

According to sub clause 18.3.1.1 of 3GPP TS 24.282: SDP offer generation: when composing an SDP offer according to 3GPP TS 24.229, IETF RFC 4975, IETF RFC 6135 and IETF RFC 6714 the MCData client:

1) Shall include an "m=message" media-level section for the MCData media stream including:
   a) the port number;
   b) a protocol field value of "transmission control protocol (TCP)/message session relay protocol (MSRP)" or "TCP/TLS/MSRP" for TLS;
   c) an "a=sendrecv" attribute;
   d) an "a=path" attribute containing its own MSRP URI;
   e) set the content type as "a=accept types: application/vnd.3gpp.mcdata-signalling application/vnd.3gpp.mcdata-payload"; and
   f) set the a=setup attribute as "actpass".

According to sub-clause 18.3.1.2 of 3GPP TS 24.282: SDP answer generation: when composing the SDP answer according to 3GPP TS 24.229, the participating MCData server (200):

1) Shall replace the IP address and port number in the received SDP answer with the IP address and port number of the participating MCData server (200), for the accepted media stream in the received SDP offer, if required; and
2) If the IP address is replaced shall insert its MSRP URI before the MSRP URI in the "a=path" attribute in the SDP answer.

According to sub-clause 18.3.2.1: the originating MCData client device (100a) procedures: when the originating MCData client device (100a) initiates the pre-established session the originating MCData client device (100a) shall:

1) Gather ICE candidates according to IETF RFC 5245; and ICE candidates are only gathered on interfaces that the MCData UE uses to obtain MCData service.
2) Generate an initial SIP INVITE request by following the UE originating session procedures specified in 3GPP TS 24.229, with the clarifications given below.

The originating MCData client device (100a):

1) Shall set the Request-URI of the SIP INVITE request to the public service identity of the participating MCData server (200) serving the MCData user (i.e. MCData client device (100a));
2) May include a P-Preferred-Identity header field in the SIP INVITE request containing a public user identity as specified in 3GPP TS 24.229;
3) Shall include the g.3gpp.mcdata.sds media feature tag in the Contact header field of the SIP INVITE request according to IETF RFC 3840;
4) Shall include an Accept-Contact header field with the media feature tag g.3gpp.mcdata.sds along with parameters "require" and "explicit" according to IETF RFC 3841;
5) Shall include the ICSI value "urn:urn-7:3gpp-service.ims.icsi.mcdata.sds" (coded as specified in 3GPP TS 24.229), in a P-Preferred-Service header field according to IETF RFC 6050 in the SIP INVITE request;
6) Shall include an Accept-Contact header field with the media feature tag g.3gpp.icsi-ref set to the value "urn:urn-7:3gpp-service.ims.icsi.mcdata.sds" along with parameters "require" and "explicit" according to IETF RFC 3841;
7) Shall include the "timer" option tag in the Supported header field;
8) Should include the Session-Expires header field according to IETF RFC 4028 and should not include the "refresher" header field. The "refresher" header field parameter shall be set to "uac" if included;
9) Shall include in the application/vnd.3gpp.mcdata-info+xml MIME body with the <mcdataInfo> element containing the <mcdata-Params> element with the <anyExt> element an <pre-established-session-ind> element set to a value of "true";
10) Shall include an SDP offer according to 3GPP TS 24.229 with the clarifications given in sub-clause 18.3.1.1, and include ICE candidates in the SDP offer as per IETF RFC 5245; and
11) Shall send the SIP INVITE request according to 3GPP TS 24.229.

Upon receiving a SIP 2xx response to the SIP INVITE request the originating MCData client device (100a):

1) Shall interact with the media plane as specified in 3GPP TS 24.582.

According to sub-clause 18.3.2.2 of 3GPP TS 24.282: the participating MCData server (200) procedures: upon receipt of a "SIP INVITE request for establishing the pre-established session" the participating MCData server (200):

1) Shall check whether the public service identity is allocated and if it is not allocated, shall return a SIP 404 (Not Found) response. Otherwise, continue with the rest of the steps;
2) Shall determine the MCData ID of the MCData user establishing the pre-established session and perform actions to verify the MCData ID of the originating MCData client device (100a) and authorize the request according to local policy, and if not authorised, the participating MCData server (200) shall return a SIP 403 (Forbidden) response with the warning text set to "225 User not authorized to initiate pre-established session" as specified in sub-clause 4.9. Otherwise, continue with the rest of the steps;
3) Shall determine whether resource sharing is supported (see sub-clause 18.2);
4) If resource sharing is supported by the SIP core, determine that there is a binding between the MCData ID of the MCData user establishing the pre-established session and the MCData UE identified by the "±g.3gpp.registration-token" header field parameter in the Contact header field of the third-party REGISTER request (see sub-clause 18.2) and that this UE identity matches the identity in the "±g.3gpp.registration-token" header field parameter in the Feature-Caps header field in the "SIP INVITE request for establishing the pre-established session";
5) If resource sharing is not supported or if there is no binding between the MCData ID of the MCData user and the identity of the MCData UE identified by the "±g.3gpp.registration-token" header field parameter in the Feature-Caps header field, then the participating MCData server (200) shall return a SIP 403 (Forbidden) response with the warning text set to "226 function not allowed due to the pre-established session not supported" as specified in sub-clause 4.9 and not continue with the rest of the steps;
6) Shall determine if the media parameters are acceptable and the MSRP URI is offered in the SDP offer and if not reject the request with a SIP 488 (Not Acceptable Here) response and skip the rest of the steps;
7) Shall verify that the media resources are available to support the media parameters and if not shall reject the request with a SIP 500 (Server Internal Error) response, and shall not continue with the rest of the steps;
8) Shall allocate a URI to be used to identify the pre-established session;
9) Shall generate a SIP 200 (OK) response to the SIP INVITE request according to 3GPP TS 24.229; and
   a) shall include a Contact header field containing the URI that identifies the pre-established session;
   b) shall include the public service identity in the P-Asserted-Identity header field;
   c) shall include a Supported header field containing the "norefersub" option tag;
   d) shall if the SIP core supports resource sharing, include a Resource-Share header field answer as specified in 3GPP TS 24.229 with:
      A) the value "media-sharing";
      B) an "origin" header field parameter set to "session-initiator";
      C) a "timestamp" header field parameter; and
      D) a "rules" header field parameter with one resource sharing rule per media stream in the same order the corresponding m-line appears in the SDP. Each resource sharing rule is constructed as follows:
         a "new-sharing-key" part; and
         a "directionality" part indicating the direction of the pre-established media stream; and
   e) Shall include an SDP answer as specified in 3GPP TS 24.229 with the clarifications in sub-clause 18.3.1.2 and include ICE candidates in the SDP answer as per IETF RFC 5245;
10) Shall interact with the media plane as specified in 3GPP TS 24.582;
11) Shall send the SIP 200 (OK) response towards the originating MCData client device (100a) according to the rules and procedures of the 3GPP TS 24.229; and
12) Shall evaluate the ICE candidates according to IETF RFC 5245. If ICE candidate evaluation results in candidate pairs other than the default candidate pair being selected a further offer answer exchange using the procedures in sub-clause 18.3.4 will be needed.

According to sub-clause 18.3.3.1.1 of 3GPP TS 24.282: the originating MCData client device (100a) initiated release procedures: the originating MCData client device (100a) needs to be prepared to release the pre-established session when receiving a SIP BYE request generated by the SIP core (e.g. Due to network release of media plane resources). When the originating MCData client device (100a) needs to release the pre-established session as created in sub-clause 18.3.2, the originating MCData client device (100a) shall perform the procedure as described in sub-clause 13.2.2.2.2.1 of 3GPP specification TS 24.282.

According to sub-clause 18.3.3.1.2 of 3GPP TS 24.282: the participating MCData server (200) initiated release procedures: upon receiving a SIP BYE request from the participating MCData server (200) within the pre-established session the originating MCData client device (100a) shall check whether there are any MCData sessions using the pre-established session, and:
   1) If there is an established MCData session then the originating MCData client device (100a) shall remove the Originating MCData client device (100a) from the MCData session by performing the procedures for session release for each MCData session as specified in 3GPP TS 24.582; and
   2) If there is no MCData session using the pre-established session, then the originating MCData client device (100a) shall follow the procedure described in sub-clause 13.2.3.2.2 of 3GPP specification TS 24.282.

According to sub-clause 18.3.3.2.1 of 3GPP TS 24.282, the originating MCData client device (100a) initiated release procedures: upon receiving a SIP BYE request from the originating MCData client device (100a) within the pre-established session the participating MCData server (200):
   1) Shall check whether there is an MCData session using the pre-established session, and:
      a) if there is an established MCData session then the participating MCData server (200) shall remove the originating MCData client device (100a) from the MCData session by performing the procedures as specified in sub-clause 13.2.2.2.3.1 of 3GPP specification TS 24.282; and
      b) If there is an MCData session in the process of being established, then the participating MCData server (200):
         i) shall send a SIP CANCEL request to cancel the MCData session in the process of being established as specified in 3GPP TS 24.229; and
         ii) shall release the MCData session as specified in the sub-clause 13.2.2.2.3.1 of 3GPP specification TS 24.282, if a SIP 200 (OK) response for the SIP INVITE request is received from the remote side; and
      c) if there is no MCData session using the pre-established session, then the participating MCData server (200) shall:
         i) Interact with the media plane as specified in 3GPP TS 24.582 for disconnecting the media plane resources towards the originating MCData client device (100a); and
         ii) Shall generate and send a SIP 200 (OK) response to the SIP BYE request according to rules and procedures of 3GPP TS 24.229.

Upon receiving a SIP 200 (OK) response to the SIP BYE request from the remote side, the participating MCData server (200):
   1) Shall interact with the media plane as specified in 3GPP TS 24.582 for releasing media plane resources towards the originating MCData client device (100a); and
   2) Shall send a SIP 200 (OK) response to the SIP BYE request to the originating MCData client device (100a).

According to sub-clause 18.3.3.2.2 of 3GPP TS 24.282: participating MCData server (200) initiated release procedures: when a participating MCData server (200) needs to release the pre-established session as created in sub-clause 8.2.2 of 3GPP specification TS 24.282, the participating MCData server (200):
   1) Shall first release any participants of all MCData calls that are using the pre-established session. The participating MCData server (200) shall remove the originating MCData client device (100a) from the MCData session by performing the procedures as specified in sub-clause 13.2.2.2.3.1 of 3GPP specification TS 24.282:
   2) Shall generate a SIP BYE request according to rules and procedures of 3GPP TS 24.229;
   3) Shall set the Request-URI of the SIP BYE request to the URI that identifies the pre-established session;
   4) Shall send the SIP BYE request towards the originating MCData client device (100a) within the SIP dialog of the pre-established session according to rules and procedures of the 3GPP TS 24.229; and 5) Shall, upon receiving a SIP 200 (OK) response to the SIP BYE request interact with the media plane as specified in 3GPP TS 24.582.

According to sub-clause 6.3.1.2 of 3GPP TS 24.282: SIP INVITE request: the participating MCData server (200) needs to distinguish between the following SIP INVITE requests for originations and terminations, SIP INVITE requests routed to the participating MCData server (200) with the Request-URI set to a public service identity of the participating MCData server (200) and contain in an application/vnd.3gpp.mcdata-info+xml MIME body with the <mcdataInfo> element containing the <mcdata-Params> element with the <anyExt> element an <pre-established-session-ind> element set to a value of "true". Such requests are known as "SIP INVITE request for establishing the pre-established session" in the procedures in the present disclosure.

Figure 4:
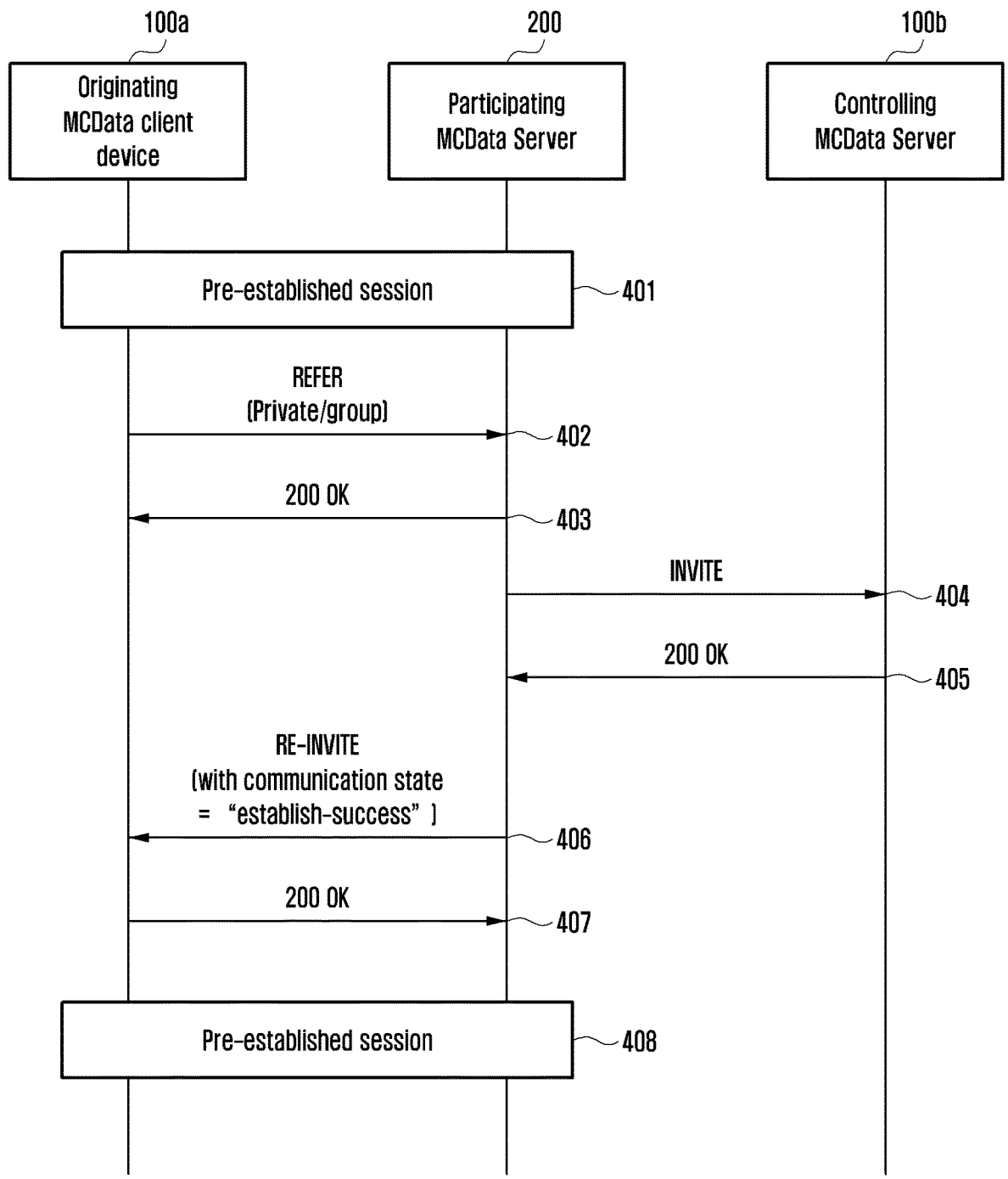
FIG. 4 and FIG. 5 are sequence diagrams illustrating an example method for initiating an outgoing MCData communication using the pre-establish session, according to an embodiment.
Figure 5:
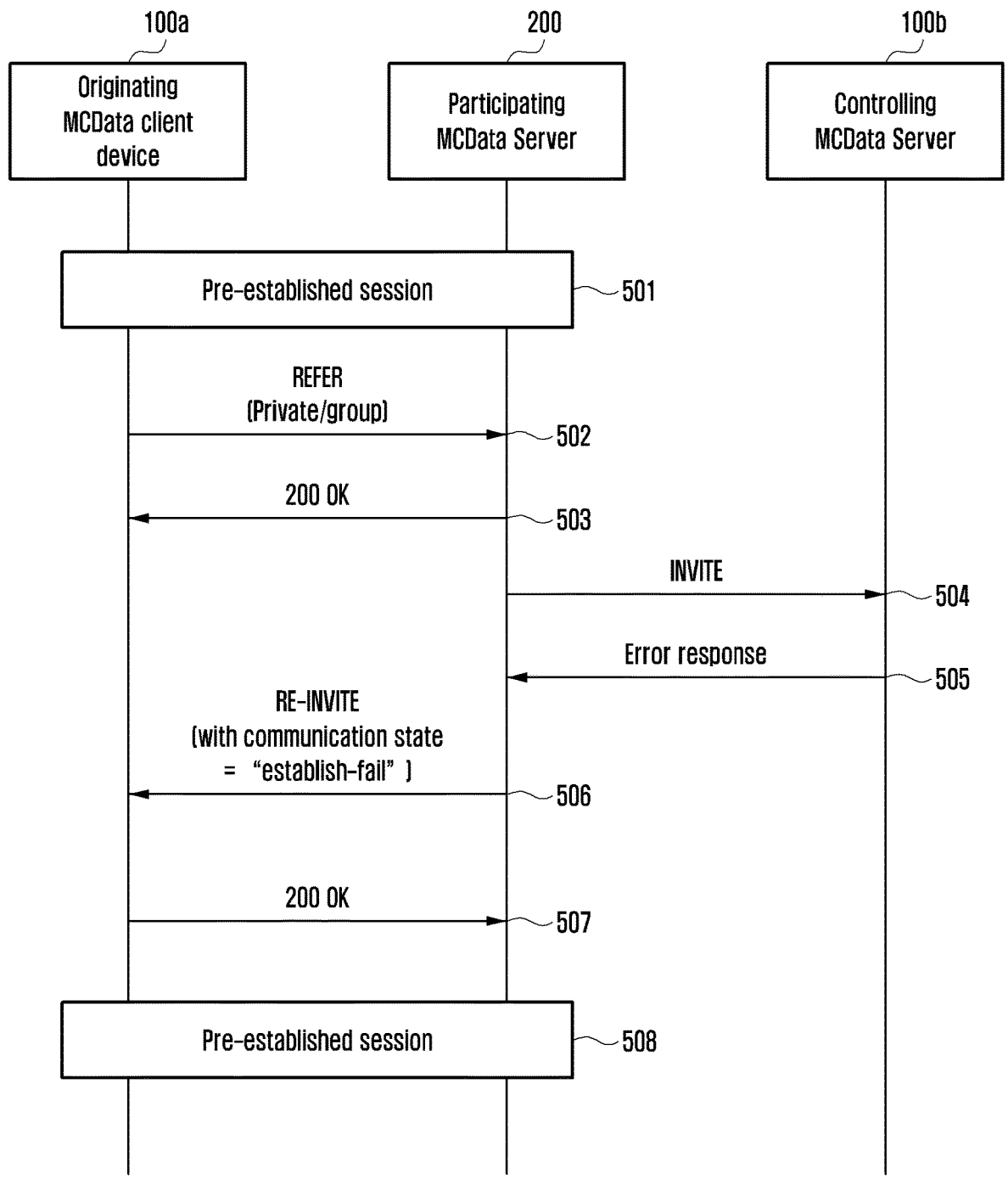

FIGS. 4 and 5 is a sequence diagram illustrating a method for initiating an outgoing MCData communication using the pre-establish session, according to an example embodiment as disclosed herein.

At step-401, the pre-establish session established between the originating MCData client device (100a) and the participating MCData server (200). At step-402, the participating MCData server (200) receives the MCData communication refer request message from the originating MCData client device (100a) to establish the MCData communication session towards the controlling MCData server (100b). At step-403, the participating MCData server (200) sends the acknowledgement to the originating MCData client device (100a) in response to receiving the MCData communication refer request message. At step-404, the participating MCData server (200) sends the MCData communication invite request message towards the controlling MCData server (100b) to establish the MCData communication session with the originating MCData client device (100a). At step-405, the participating MCData server (200) receives the MCData communication session establishment successful message from the controlling MCData server (100b).

At step-406, the participating MCData server (200) sends the MCData-communication-state message to the originating MCData client device (100a) in response to receiving the MCData communication session establishment successful message from the controlling MCData server (100b), where the MCData-communication-state message comprises an establish-success indication indicating that the MCData communication is established successfully within the pre-established session. At step-407, the participating MCData server (200) receives the acknowledgement message from the originating MCData client device (100a) in response to the at least one MCData-communication-state. At step-408, the participating MCData server (200) retains the at least one pre-established session with the originating MCData client device (100a).

At step-501, the pre-establish session established between the originating MCData client device (100a) and the participating MCData server (200). At step-502, the participating MCData server (200) receives the MCData communication refer request message from the originating MCData client device (100a) to establish the MCData communication session towards the controlling MCData server (100b). At step-503, the participating MCData server (200) sends the acknowledgement to the originating MCData client device (100a) in response to receiving the MCData communication refer request message. At step-504, the participating MCData server (200) sends the MCData communication invite request message towards the controlling MCData server (100b) to establish the MCData communication session with the originating MCData client device (100a). At step-505, the participating MCData server (200) receives the MCData communication session establishment failure or reject message from the controlling MCData server (100b).

At step-506, the participating MCData server (200) sends the MCData-communication-state message to the originating MCData client device (100a) in response to receiving the MCData communication session establishment failure or reject message from the controlling MCData server (100b), where the MCData-communication-state message comprises an establish-fail indication indicating that the MCData communication is not established successfully within the pre-established session. At step-507, the participating MCData server (200) receives the acknowledgement message from the originating MCData client device (100a) in response to the at least one MCData-communication-state. At step-508, the participating MCData server (200) retains the at least one pre-established session with the originating MCData client device (100a).

According to sub-clause 9.2.5.1.1 of 3GPP TS 24.282: generating an INVITE request on receipt of a REFER request: this sub-clause is referenced from other procedures. When generating an initial SIP INVITE request according to 3GPP TS 24.229, on receipt of an incoming SIP REFER request, the participating MCData server (200):

1) Shall include in the SIP INVITE request all header fields included in the headers portion of the SIP URI contained in the <entry> element of the application/resource-lists MIME body, referenced by the "cid" URL in the Refer-To header field in the incoming SIP REFER request;
2) Should include the Session-Expires header field according to IETF RFC 4028 [38].
3) Shall include the option tag "timer" in the Supported header field;
4) Shall copy the contents of the P-Asserted-Identity header field of the incoming SIP REFER request to the P-Asserted-Identity header field of the outgoing SIP INVITE request;
5) Shall include the g.3gpp.mcdata.sds media feature tag and the g.3gpp.icsi-ref media feature tag with the value of "urn: urn-7:3gpp-service.ims.icsi.mcdata.sds" into the Contact header field of the outgoing SIP INVITE request;
6) Shall include the ICSI value "urn: urn-7:3gpp-service-.ims.icsi.mcdata.sds" (coded as specified in 3GPP TS 24.229), into the P-Asserted-Service header field of the outgoing SIP INVITE request; and
7) Shall include in the SIP INVITE request the option tag "tdialog" in a Supported header field according to the rules and procedures of IETF RFC 4538;
8) Shall include in the SIP INVITE request an SDP offer as specified in sub-clause 9.2.3.3.1 based upon:
    a) the SDP negotiated during the pre-established session establishment and any subsequent pre-established session modification; and
    b) the SDP offer (if any) included in the "body" URI parameter of the SIP-URI contained in the <entry> element of the application/resource-lists MIME body, referenced by the "cid" URL in the Refer-To header field in the incoming SIP REFER request for the pre-established session;
9) Shall copy the application/vnd.3gpp.mcdata-info+xml MIME body from the "body" URI header field of the SIP-URI in the application/resource-lists MIME body, referenced by the "cid" URL in the Refer-To header field of the SIP REFER request, to the outgoing SIP INVITE request; and 10) If the incoming SIP REFER request contained an application/resource-lists MIME body in the "body" URI header field of the SIP-URI contained in the <entry> element of an application/resource-lists MIME body, referenced by the "cid" URL in the Refer-To header field, shall copy the application/resources-lists MIME body in the "body" URI header field to the SIP INVITE request.

According to sub-clause 9.2.5.1.2 of 3GPP TS 24.282: generating Re-INVITE request towards the originating MCData client device (100a) within the pre-established session procedures: the sub-clause is referenced from other procedures. The participating MCData server (200):

1) Shall generate a SIP re-INVITE request according to 3GPP TS 24.229 to be sent within the SIP dialog of the pre-established session;
2) Shall include in the application/vnd.3gpp.mcdata-info+xml MIME body in the outgoing Re-INVITE request:
   a) the <mcdata-communication-state> element with a value set to "establish-success", if a SIP 2xx response is received to a SIP-INVITE request sent to the controlling MCData server (100b); or
   b) the <mcdata-communication-state> element with a value set to "establish-fail", if an error response is received to a SIP-INVITE request sent to the controlling MCData server (100b);

According to sub-clause 9.2.5.2 of 3GPP TS 24.282: initiating one-to-one SDS communication: the procedures in this sub-clause are used to initiate one-to-one standalone SDS using media plane or one-to-one SDS session within the pre-established session.

According to sub-clause 9.2.5.2.1.1 of 3GPP TS 24.282: client originating procedures (originating MCData client device (100a) procedures): upon receiving a request from an MCData user to initiate one-to-one standalone SDS using media plane or one-to-one SDS session within the pre-established session, the originating MCData client device (100a) shall generate a SIP REFER request outside a dialogue as specified in IETF RFC 3515 as updated by IETF RFC 6665 and IETF RFC 7647, and in accordance with the UE procedures specified in 3GPP TS 24.229, with the clarifications given below, The originating MCData client device (100a):

1) Shall set the Request URI of the SIP REFER request to the session identity of the pre-established session;
2) Shall set the Refer-To header field of the SIP REFER request as specified in IETF RFC 3515 with a Content-ID ("cid") Uniform Resource Locator (URL) as specified in IETF RFC 2392 that points to an application/resource-lists MIME body as specified in IETF RFC 5366, and with the Content-ID header field set to this "cid" URL;
3) If an end-to-end security context needs to be established and the security context does not exist or if the existing security context has expired, then:
   i) if necessary, shall instruct the key management client to request keying material from the key management server as described in 3GPP TS 33.180;
   ii) shall use the keying material to generate a PCK as described in 3GPP TS 33.180;
   iii) shall use the PCK to generate a PCK-ID with the four most significant bits set to "0001" to indicate that the purpose of the PCK is to protect one-to-one communications and with the remaining twenty eight bits being randomly generated as described in 3GPP TS 33.180;
   iv) shall encrypt the PCK to a UID associated to the originating MCData client device (100a) using the MCData ID of the invited user and a time related parameter as described in 3GPP TS 33.180;
   v) shall generate a MIKEY-SAKKE I_MESSAGE using the encapsulated PCK and PCK-ID as specified in 3GPP TS 33.180;
   vi) shall add the MCData ID of the originating MCData to the initiator field (IDRi) of the I_MESSAGE as described in 3GPP TS 33.180; and
   vii) shall sign the MIKEY-SAKKE I_MESSAGE using the originating MCData user's signing key provided in the keying material together with a time related parameter, and add this to the MIKEY-SAKKE payload, as described in 3GPP TS 33.180;
4) Shall include in the application/resource-lists MIME body a single <entry> element containing a "uri" attribute set to MCData ID of the called user, extended with the following URI header fields:
   Characters that are not formatted as ASCII characters are escaped in the following URI header fields;
   a) an hname "body" URI header field populated with:
      i) an application/sdp MIME body containing an SDP offer with media attributes specified in sub-clause 9.2.3.2.1 of 3GPP specification TS 24.282, if a one-to-one standalone SDS message is requested;
      ii) an application/vnd.3gpp.mcdata-info MIME body with:
         A) If a one-to-one standalone SDS message is requested, the <request-type> element set to a value of "one-to-one-sds". If a one-to-one SDS session is requested, the <request-type> element set to a value of "one-to-one-sds-session"; and
         B) The <mcdata-client-id> element set to the originating MCData client device (100a) ID of the originating MCData client device (100a); and
5) Shall include a P-Preferred-Service header field set to the ICSI value "urn: urn-7:3gpp-service.ims.icsi.mcdata.sds" (coded as specified in 3GPP TS 24.229), according to IETF RFC 6050;
6) May include a P-Preferred-Identity header field in the SIP INVITE request containing a public user identity as specified in 3GPP TS 24.229;
7) Shall include the following according to IETF RFC 4488:
   a) the option tag "norefersub" in the Supported header field; and
   b) the value "false" in the Refer-Sub header field.
8) Shall include a Target-Dialog header field as specified in IETF RFC 4538 identifying the pre-established session;
9) Shall include the g.3gpp.mcdata.sds media feature tag in the Contact header field of the SIP REFER request according to IETF RFC 3840; and
10) Shall send the SIP REFER request according to 3GPP TS 24.229.

On receiving a final SIP 2xx response to the SIP REFER request, the originating MCData client device (100a):

1) Shall interact with the media plane as specified in 3GPP TS 24.582.

On receiving a SIP re-INVITE request within the pre-established session targeted by the sent SIP REFER request, the originating MCData client device (100a):
1) If the <mcdata-communication-state> element in the application/vnd.3gpp.mcdata-info+xml MIME body of the SIP INVITE request is set to a value of "establish-success":
   i) shall notify MCData user about successful the MCData communication establishment;
2) If the <mcdata-communication-state> element in the application/vnd.3gpp.mcdata-info+xml MIME body of the SIP INVITE request is set to a value of "establish-fail":
   i) shall notify MCData user about the MCData communication establishment failure; and
3) Shall interact with the media plane as specified in 3GPP TS 24.582;

In sub-clause 9.2.5.2.2.1 of 3GPP TS 24.282: originating procedures: upon receiving a SIP REFER request, with:
1) The Request-URI set to a public service identity identifying the pre-established session on the Participating MCData server (200);
2) The Refer-To header field containing a Content-ID ("cid") Uniform Resource Locator (URL) as specified in IETF RFC 2392 that points to an application/resource-lists MIME body as specified in IETF RFC 5366 containing one or more <entry> element(s) with a "uri" attribute containing a SIP-URI set to the MCData ID of the called user(s);
3) a body" URI header field of the SIP-URI specified above containing an application/vnd.3gpp.mcdata-info MIME body with the <request-type> element set to "one-to-one-sds" or "one-to-one-sds-session"; and
4) a Content-ID header field set to the "cid" URL;

The participating MCData server (200):
1) If unable to process the request due to a lack of resources or a risk of congestion exists, may reject the SIP INVITE request with a SIP 500 (Server Internal Error) response. The participating MCData server (200) may include a Retry-After header field to the SIP 500 (Server Internal Error) response as specified in IETF RFC 3261 and shall not continue with the rest of the steps;
2) Shall determine the MCData ID of the calling user from public user identity in the P-Asserted-Identity header field of the SIP REFER request;
3) If the participating MCData server (200) cannot find a binding between the public user identity and an MCData ID or if the validity period of an existing binding has expired, then the participating MCData server (200) shall reject the SIP REFER request with a SIP 404 (Not Found) response with the warning text set to "141 user unknown to the participating function" in a Warning header field as specified in sub-clause 4.9, and shall not continue with any of the remaining steps;
4) Shall determine whether the MCData user identified by the MCData ID is authorised for MCData communications by following the procedures in sub-clause 11.1 of 3GPP specification TS 24.282;
   i) if the procedures in sub-clause 11.1 of 3GPP specification TS 24.282 indicate that the user identified by the MCData ID is not allowed to initiate MCData communications, shall reject the SIP REFER request with a SIP 403 (Forbidden) response with warning text set to "200 user not authorised to transmit data" in a Warning header field as specified in sub-clause 4.9, and shall not continue with the rest of the steps in this sub-clause;
5) If the received SIP REFER request does not contain an application/resource-lists MIME body referenced by a "cid" URL in the Refer-To header field, shall reject the SIP REFER request with a SIP 403 (Forbidden) response including warning text set to "145 unable to determine called party" in a Warning header field as specified in sub-clause 4.9 of 3GPP specification TS 24.282, and shall not continue with the rest of the steps;
6) If the received SIP REFER request contains an application/resource-lists MIME body referenced by a "cid" URL in the Refer-To header field with more than one <entry> element each with an application/vnd.3gpp.mcdata-info MIME body with the <request-type> element set to "one-to-one-sds" or "one-to-one-sds-session", determine that the communication type is one-to-one standalone SDS or one-to-one SDS session.
7) Shall determine the public service identity of the controlling MCData server (100b) associated with the originating user's MCData ID;
   i) If the participating MCData server (200) is unable to identify the controlling MCData server (100b), it shall reject the REFER request with a SIP 404 (Not Found) response with the warning text "142 unable to determine the controlling function" in a Warning header field as specified in sub-clause 4.9 of 3GPP specification TS 24.282, and shall not continue with any of the remaining steps;
8) If the SIP REFER request contained a Refer-Sub header field containing "false" value and a Supported header field containing "norefersub" value, shall handle the SIP REFER request as specified in 3GPP TS 24.229, IETF RFC 3515 as updated by IETF RFC 6665, and IETF RFC 4488 without establishing an implicit subscription;
9) Shall generate a final SIP 200 (OK) response to the SIP REFER request according to 3GPP TS 24.229;

In accordance with IETF RFC 4488, the participating MCData server (200) inserts the Refer-Sub header field containing the value "false" in the SIP 200 (OK) response to the SIP REFER request to indicate that it has not created an implicit subscription.
10) Shall send the response to the SIP REFER request towards the originating MCData client device (100a) according to 3GPP TS 24.229;
11) Shall generate SIP INVITE request as described in sub-clause 9.2.5.1.1.
12) Shall set the Request-URI of the SIP INVITE request to the public service identity of the controlling MCData server (100b) service for the calling MCData user as determined above in step 7); and
13) Shall forward the SIP INVITE request according to 3GPP TS 24.229.

Upon receiving a SIP 200 (OK) response for the SIP INVITE request the participating MCData server (200):
1) Shall interact with the media plane as specified in 3GPP TS 24.582;
2) Shall generate a SIP re-INVITE request as specified in sub-clause 9.2.5.1.2 with following clarifications:
   i) Shall set the Request-URI to a public service identity identifying the pre-established session;
3) Shall send the SIP re-INVITE request towards the originating MCData client device (100a) according to 3GPP TS 24.229; and 4) Upon receipt of a SIP 2xx response to the SIP re-INVITE, shall interact with the media plane as specified in 3GPP TS 24.582.

In sub-clause 9.2.5.3 of 3GPP TS 24.282, initiating group SDS communication procedures: the procedures in this sub-clause are used to initiate group standalone SDS using media plane or group SDS session within the pre-established session.

In sub-clause 9.2.5.3.1.1 of 3GPP TS 24.282: client originating procedures (originating MCData client device (100a) procedures): upon receiving a request from an MCData user to initiate one-to-one standalone SDS using media plane or one-to-one SDS session within the pre-established session, the originating MCData client device (100a) shall generate a SIP REFER request outside a dialog as specified in IETF RFC 3515 as updated by IETF RFC 6665 and IETF RFC 7647, and in accordance with the UE procedures specified in 3GPP TS 24.229, as specified in sub-clause 9.2.5.1.1 with the following clarifications:
1) Shall skip step 3); and
2) Shall include in the application/resource-lists MIME body a single <entry> element containing a "uri" attribute set to the MCData group identity, extended with the following URI header fields:

Characters that are not formatted as ASCII characters are escaped in the following URI header fields;
  a) an hname "body" URI header field populated with:
    i) an application/sdp MIME body containing an SDP offer with media attributes specified in sub-clause 9.2.3.2.1, if a group standalone SDS message is requested;
    ii) an application/vnd.3gpp.mcdata-info MIME body with:
      A) If a group standalone SDS message is requested, the <request-type> element set to a value of "group-sds". If a group SDS session is requested, the <request-type> element set to a value of "group-sds-session";
      B) The <mcdata-request-uri> element set to the MCData group identity; and
      C) The <mcdata-client-id> element set to the MCData client ID of the originating MCData client device (100a);

In the sub-clause 9.2.5.3.2.1 of 3GPP TS 24.282: originating procedures (i.e. participating MCData server (200) procedures): upon receiving a SIP REFER request, with:
1) The Request-URI set to a public service identity identifying the pre-established session on the participating MCData server (200);
2) The Refer-To header field containing a Content-ID ("cid") Uniform Resource Locator (URL) as specified in IETF RFC 2392 that points to an application/resource-lists MIME body as specified in IETF RFC 5366 containing one or more <entry> element(s) with a "uri" attribute containing a SIP-URI set to the MCData group identity;
3) A body" URI header field of the SIP-URI specified above containing an application/vnd.3gpp.mcdata-info MIME body with the <request-type> element set to "group-sds" or "group-sds-session"; and
4) A Content-ID header field set to the "cid" URL; The participating function shall follow the procedure as described in sub-clause 9.2.5.2.2.1 of 3GPP TS 24.282.

Figure 6:
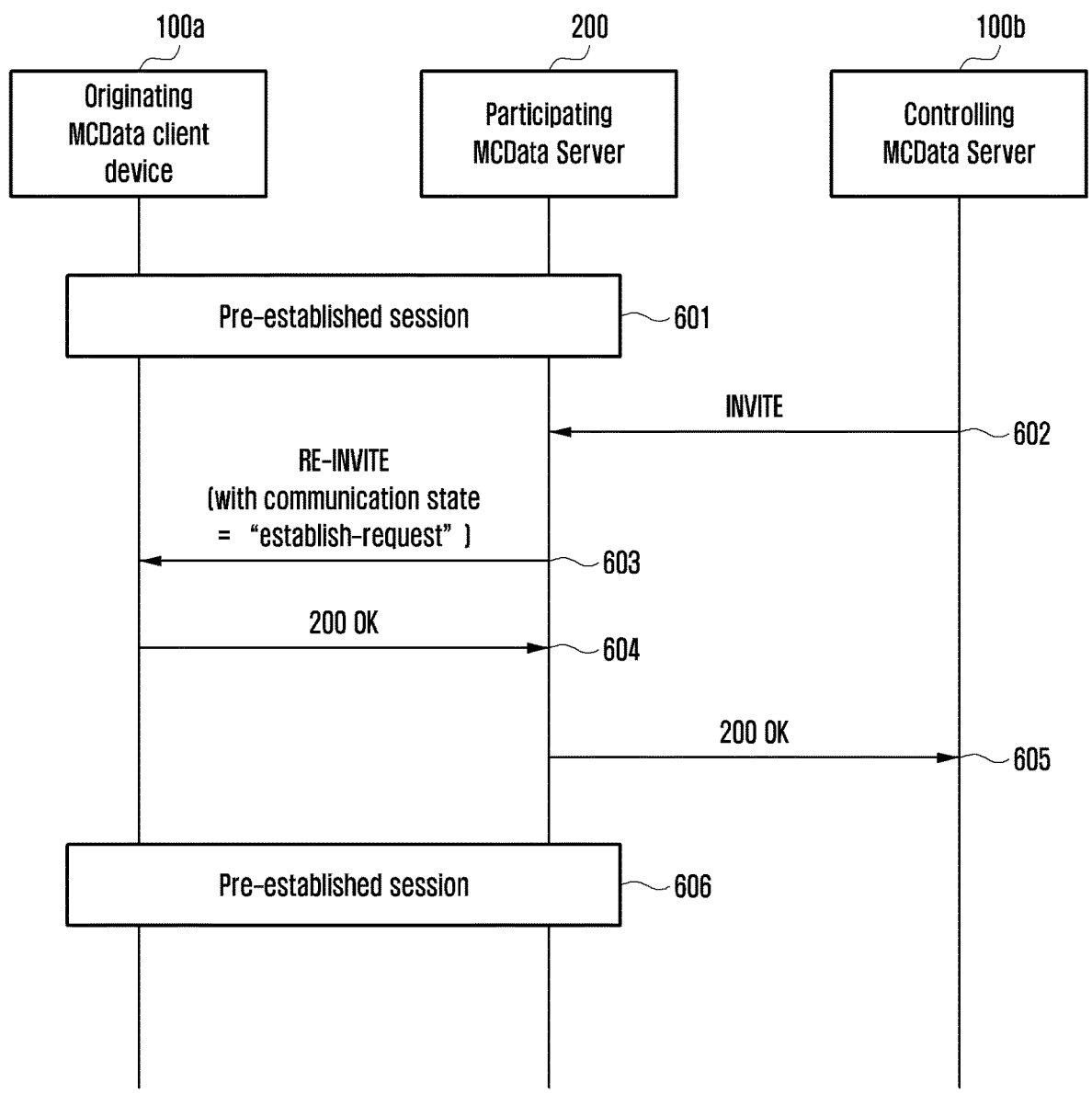
FIG. 6 is a sequence diagram illustrating an example method for initiating an incoming MCData communication using the pre-establish session, according to an embodiment.

FIG. 6 is a sequence diagram illustrating a method for initiating an incoming MCData communication using the pre-establish session, according to an example embodiment as disclosed herein.

At step-601, the pre-establish session established between the originating MCData client device (100a) and the participating MCData server (200). At step-602, the participating MCData server (200) receives the MCData communication invite message request from the controlling MCData server (100b) to establish the MCData communication session with the originating MCData client device (100a). At step-603, the participating MCData server (200) sends the MCData-communication-state message to the originating MCData client device (100a) in response to receiving the MCData communication invite message request from the controlling MCData server (100b), where the MCData-communication-state message comprises the establish-request indication indicating that the request is to establish MCData communication within the pre-established session. At step-604, the participating MCData server (200) receives the acknowledgement message from the originating MCData client device (100a) in response to the MCData-communication-state. At step-605, the participating MCData server (200) sends the acknowledgement message to the controlling MCData server (100b) in response to receiving the acknowledgement message. At step-606, the participating MCData server (200) retains the at least one pre-established session with the originating MCData client device (100a).

According to sub-clause 9.2.5.1.3 of 3GPP TS 24.282: generating Re-INVITE request towards terminating MCData client (100b) within the pre-established session procedures: The sub-clause is referenced from other procedures, the participating MCData server (200):
1) Shall generate a SIP re-INVITE request according to 3GPP TS 24.229 to be sent within the SIP dialog of the pre-established session;
2) Should include the Session-Expires header field according to IETF RFC 4028 [38].
3) Shall include the option tag "timer" in the Supported header field;
4) Shall include an Accept-Contact header field containing the g.3gpp.mcdata.sds media feature tag along with the "require" and "explicit" header field parameters according to IETF RFC 3841;
5) Shall include an Accept-Contact header field with the media feature tag g.3gpp.icsi-ref with the value of "urn:urn-7:3gpp-service.ims.icsi.mcdata.sds" along with parameters "require" and "explicit" according to IETF RFC 3841;
6) Shall include in the Contact header field an MCData session identity for the MCData session with the g.3gpp.mcdata.sds media feature tag, the isfocus media feature tag and the g.3gpp.icsi-ref media feature tag with the value of "urn:urn-7:3gpp-service.ims.icsi.mcdata.sds" according to IETF RFC 3840.

According to sub-clause 9.2.5.2.1.2 of 3GPP TS 24.282: client terminating procedures: upon receiving a SIP re-INVITE request within the pre-established session without an associated MCData session, the originating MCData client device (100a):
1) if the <mcdata-communication-state> element in the application/vnd.3gpp.mcdata-info+xml MIME body of the SIP INVITE request is set to a value of "establish-request":
  i) If the <request-type> element in the application/vnd.3gpp.mcdata-info+xml MIME body of the SIP INVITE request is set to a value of "one-to-one-sds", shall follow the procedures in sub-clause 9.2.3.2.4 of 3GPP specification TS 24.282;

ii) If the <request-type> element in the application/vnd.3gpp.mcdata-info+xml MIME body of the SIP INVITE request is set to a value of "one-to-one-sds-session", shall follow the procedures in sub-clause 9.2.4.2.4 of 3GPP specification TS 24.282;

According to sub-clause 9.2.5.2.2.2 of 3GPP TS 24.282: terminating procedures of the participating MCData server (200): upon receipt of a "SIP INVITE request for standalone SDS over media plane for terminating participating MCData function" or "SIP INVITE request for SDS session for terminating participating MCData function", the participating MCData server (200):

1) If unable to process the request due to a lack of resources or a risk of congestion exists, may reject the "SIP INVITE request for terminating participating MCData function" with a SIP 500 (Server Internal Error) response. The participating MCData server (200) may include a Retry-After header field to the SIP 500 (Server Internal Error) response as specified in IETF RFC 3261, and shall not continue with the rest of the steps;
2) Shall use the MCData ID present in the <mcdata-request-uri> element of the application/vnd.3gpp.mcdata-info+xml MIME body of the incoming SIP INVITE request to retrieve the binding between the MCData ID and public user identity;
   i) If the binding between the MCData ID and public user identity does not exist, then the participating MCData server (200) shall reject the SIP INVITE request with a SIP 404 (Not Found) response. Otherwise, continue with the rest of the steps;
3) Shall generate a SIP re-INVITE request as specified in sub-clause 9.2.5.1.3 of 3GPP TS 24.282 with following clarifications:
   i) Shall set the Request-URI to a public service identity identifying the pre-established session;
   ii) if the incoming SIP INVITE request contained an application/vnd.3gpp.mcdata-info+xml MIME body, shall copy the application/vnd.3gpp.mcdata-info+xml MIME body to the outgoing SIP INVITE request with the following clarification:
      a) Shall include <mcdata-communication-state> element with a value set to "establish-request"; and
   iii) shall include the following in the Contact header field:
      a) the g.3gpp.mcdata.sds media feature tag;
      b) the g.3gpp.icsi-ref media feature tag containing the value of "urn:urn-7:3gpp-service.ims.icsi.mcdata.sds";
      c) the isfocus media feature tag;
      d) an MCData session identity mapped to the MCData session identity provided in the Contact header field of the incoming SIP INVITE request; and
      e) any other uri-parameter provided in the Contact header field of the incoming SIP INVITE request;
4) Shall send the SIP re-INVITE request towards the terminating MCData client (100b) according to 3GPP TS 24.229; and
5) Upon receipt of a SIP 2xx response to the SIP re-INVITE, shall interact with the media plane as specified in 3GPP TS 24.582.

According to sub-clause 9.2.5.3.1.2 of 3GPP TS 24.282: client terminating procedures: upon receiving a SIP re-INVITE request within the pre-established session without an associated MCData session the originating MCData client device (100a):

1) If the <mcdata-communication-state> element in the application/vnd.3gpp.mcdata-info+xml MIME body of the SIP INVITE request is set to a value of "establish-request":
   i) If the <request-type> element in the application/vnd.3gpp.mcdata-info+xml MIME body of the SIP INVITE request is set to a value of "group-sds", shall follow the procedures in sub-clause 9.2.3.2.4 of 3GPP specification TS 24.282;
   ii) If the <request-type> element in the application/vnd.3gpp.mcdata-info+xml MIME body of the SIP INVITE request is set to a value of "group-sds-session", shall follow the procedures in sub-clause 9.2.4.2.4 of 3GPP specification TS 24.282;

According to sub-clause 9.2.5.3.2.2 of 3GPP TS 24.282: terminating procedures of participating MCData server (200): upon receipt of a "SIP INVITE request for standalone SDS over media plane for terminating participating MCData server (200)" or "SIP INVITE request for SDS session for terminating participating MCData server (200)", the participating MCData server (200) shall follow the procedure as described in sub clause 9.2.5.2.2.2 of 3GPP TS 24.282.

Figure 7:
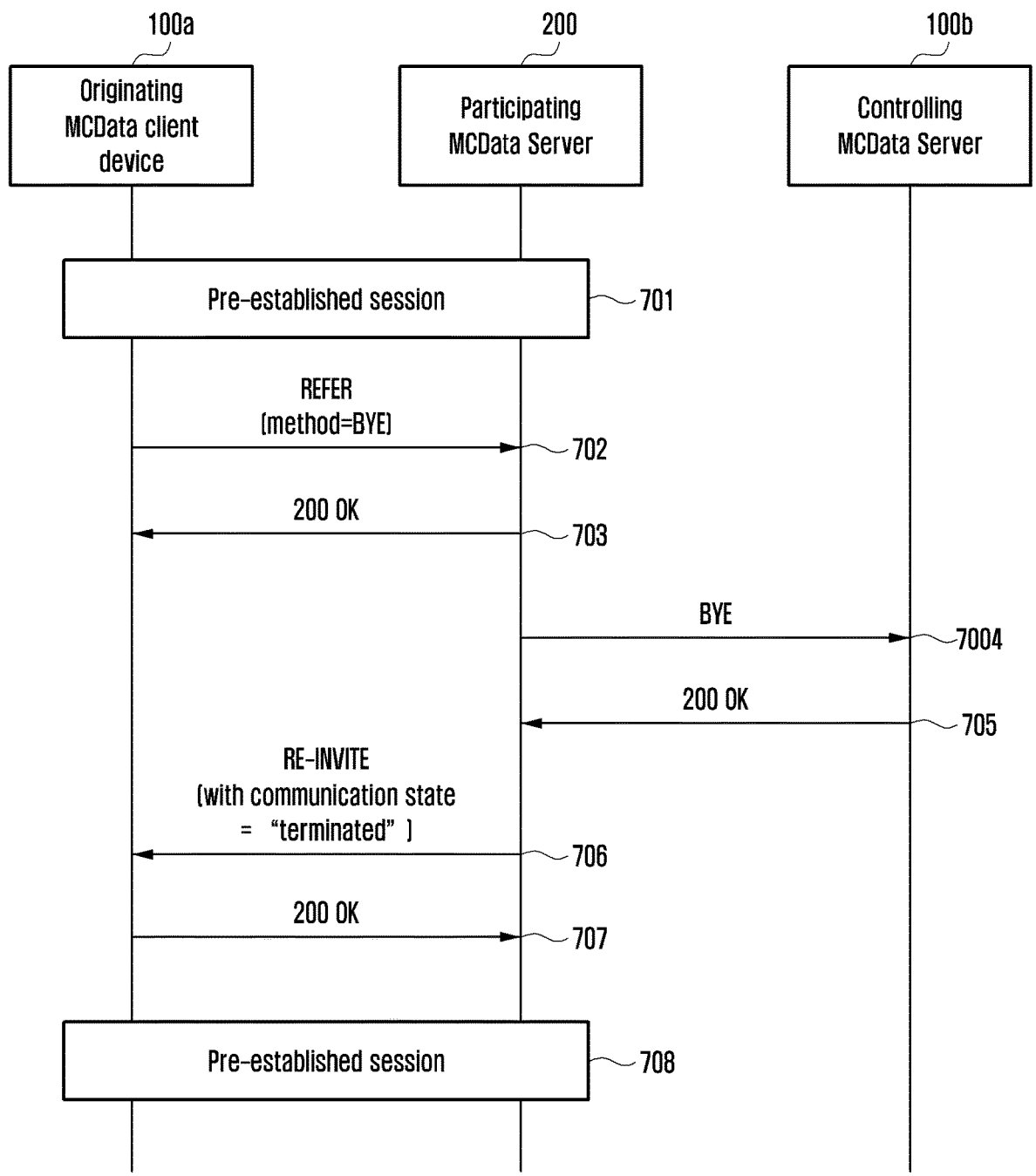
FIG. 7 is a sequence diagram illustrating an example method for initiating termination of MCData communication using the pre-establish session by an originating MCData client device, according to an embodiment.

FIG. 7 is a sequence diagram illustrating a method for initiating termination of MCData communication using the pre-establish session by the originating MCData client device (100a), according to an example embodiment as disclosed herein.

At step-701, the pre-establish session established between the originating MCData client device (100a) and the participating MCData server (200). At step-702, the participating MCData server (200) receives the MCData communication end request message from the originating MCData client device (100a) to terminate the MCData communication session towards the controlling MCData server (100b). At step-703, the participating MCData server (200) sends the acknowledgement message to the originating MCData client device (100a) in response to receiving the MCData communication end request message. At step-704, the participating MCData server (200) sends the MCData communication end request message to the controlling MCData server (100b) to terminate the MCData communication session with the originating MCData client device (100a).

At step-705, the participating MCData server (200) receives the MCData communication session terminate message from the controlling MCData server (100b). At step-706, the participating MCData server (200) sends the MCData-communication-state message to the originating MCData client device (100a) in response to receiving the MCData communication session terminate message from the controlling MCData server (100b), where the MCData-communication-state message comprises the terminated indication indicating that the MCData communication is terminated successfully within the pre-established session. At step-707, the participating MCData server (200) receives the acknowledgement message from the originating MCData client device (100a) in response to receiving the MCData-communication-state. At step-708, the participating MCData server (200) retains the at least one pre-established session with the originating MCData client device (100a).

According to sub-clause 9.2.5.4.1.1 of 3GPP TS 24.282: client originating procedures of the originating MCData client device (100a): upon receiving a request from an MCData user to leave an MCData session within the pre-established session, the originating MCData client device (100a):

1) Shall interact with the media plane as specified in 3GPP TS 24.582;
2) Shall generate an initial SIP REFER request outside a dialog in accordance with the procedures specified in 3GPP TS 24.229, IETF RFC 4488 and IETF RFC 3515 as updated by IETF RFC 6665 and IETF RFC 7647;
3) Shall set the Request-URI of the SIP REFER request to the public service identity identifying the pre-established session on the participating MCData server (200) serving the MCData user;
4) Shall include the Refer-Sub header field with value "false" according to rules and procedures of IETF RFC 4488;
5) Shall include the supported header field with value "norefersub" according to rules and procedures of IETF RFC 4488;
6) Shall set the Refer-To header field of the SIP REFER request to the MCData session identity to leave;
7) Shall include the "method" SIP URI parameter with the value "BYE" in the URI in the Refer-To header field;
8) Shall include a Target-Dialog header field as specified in IETF RFC 4538 identifying the pre-established session; and
9) Shall send the SIP REFER request according to 3GPP TS 24.229.

Upon receiving a SIP 2xx response to the SIP REFER request, the originating MCData client device (100a) shall interact with media plane as specified in 3GPP TS 24.582.

On receiving a SIP re-INVITE request within the pre-established session targeted by the sent SIP REFER request, the originating MCData client device (100a):
1) If the <mcdata-communication-state> element in the application/vnd.3gpp.mcdata-info+xml MIME body of the SIP INVITE request is set to a value of "terminated":
   i) Shall notify MCData user about successful the MCData communication termination;

According to sub-clause 9.2.5.4.2.1 of 3GPP TS 24.282: originating procedures of participating MCData server (200): upon receiving a SIP REFER request with the "method" SIP URI parameter set to value "BYE" in the URI in the Refer-To header field from the MCData client, the participating MCData server (200):
1) Shall determine the MCData ID of the calling user from public user identity in the P-Asserted-Identity header field of the SIP REFER request;
2) If the participating MCData server (200) cannot find a binding between the public user identity, then the participating MCData server (200) shall reject the SIP REFER request with a SIP 404 (Not Found) response with the warning text set to "141 user unknown to the participating function" in a Warning header field as specified in sub-clause 4.9, and shall not continue with any of the remaining steps;
3) If the SIP REFER request contained a Refer-Sub header field containing "false" value and a Supported header field containing "norefersub" value, shall handle the SIP REFER request as specified in 3GPP TS 24.229, IETF RFC 3515 as updated by IETF RFC 6665, and IETF RFC 4488 without establishing an implicit subscription;
4) Shall generate a SIP 200 (OK) response to the SIP REFER request, and in the SIP 200 (OK) response:
   a) shall include the Supported header field with value "norefersub" according to rules and procedures of IETF RFC 4488; and
   b) shall check the presence of the Refer-Sub header field of the SIP REFER request and if it is present and set to the value "false" shall include the Refer-Sub header field with value "false" according to rules and procedures of IETF RFC 4488;
5) Shall send the SIP 200 (OK) response to the SIP REFER request towards MCData client according to 3GPP TS 24.229;
6) Shall generate a SIP BYE request, and in the SIP BYE request:
   a) shall set the Request-URI to the MCData session identity which was included at the Refer-To header field of the received REFER request; and
   b) shall copy the contents of the P-Asserted-Identity header field of the received REFER request to the P-Asserted-Identity header field of the outgoing SIP BYE request; and
7) Shall send the SIP BYE request toward the controlling MCData server (100b) according to 3GPP TS 24.229.

Upon receiving a SIP 200 (OK) response to the SIP BYE request the participating MCData server (200) shall interact with the media plane as specified in 3GPP TS 24.582 [15] for releasing media plane resources associated with the SIP session with the controlling MCData server (100b). The participating MCData function shall generate a SIP re-INVITE request as specified in subclause 9.2.5.1.2 with following clarifications and send the request towards the originating MCData client according to 3GPP TS 24.229:
1) Shall set the Request-URI to a public service identity identifying the pre-established session; and
2) Shall set the <mcdata-communication-state> element with a value of "terminated".

Figure 8:
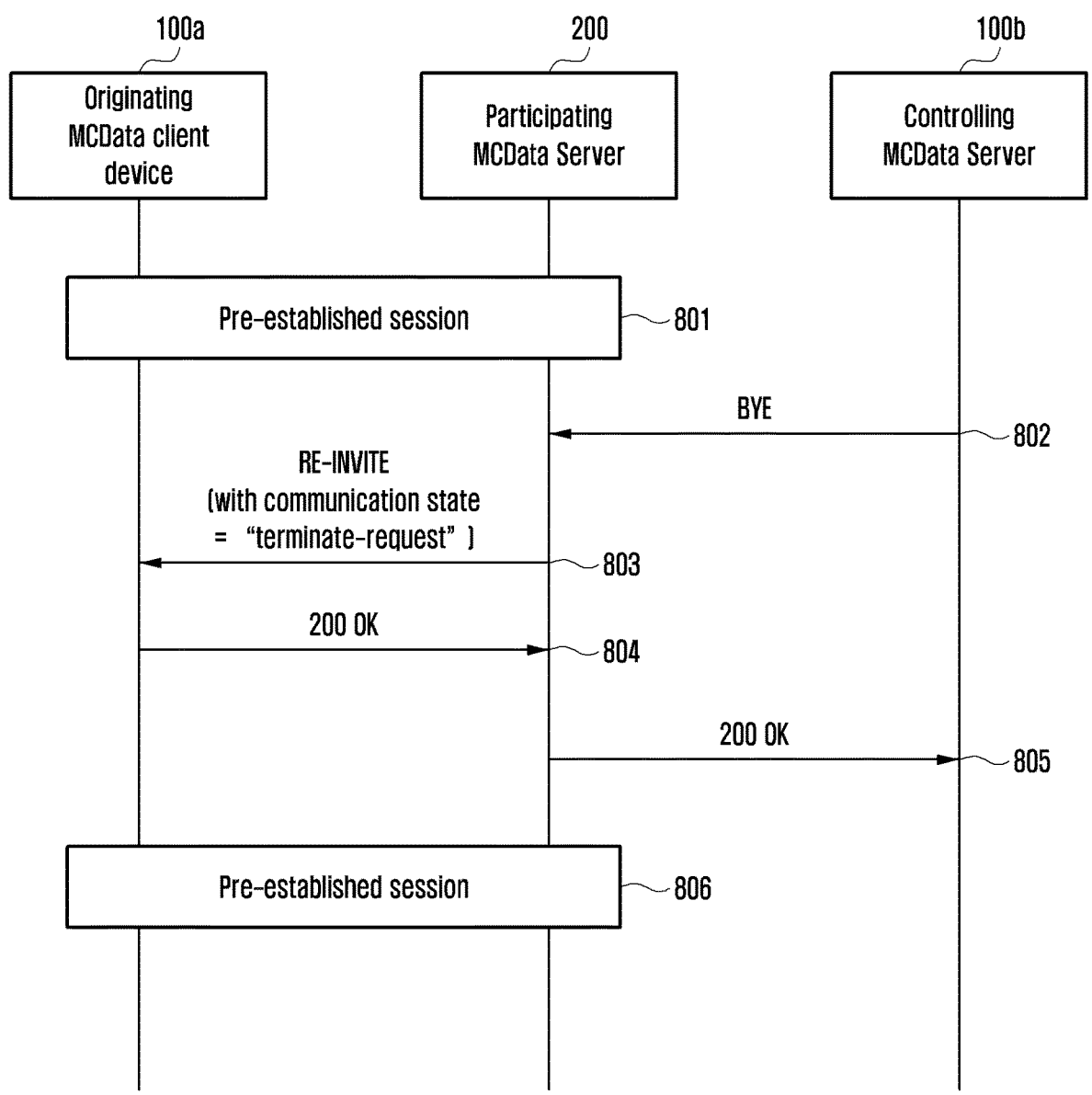
FIG. 8 is a sequence diagram illustrating an example method for initiating termination of MCData communication using the pre-establish session by a controlling MCData server, according to an embodiment.

FIG. 8 is a sequence diagram illustrating a method for initiating termination of MCData communication using the pre-establish session by the controlling MCData server (100b), according to an example embodiment as disclosed herein.

At step-801, the pre-establish session established between the originating MCData client device (100a) and the participating MCData server (200). At step-802, the participating MCData server (200) receives the MCData communication end request message from the controlling MCData server (100b) to terminate the MCData communication session with the controlling MCData server (100b). At step-803, the participating MCData server (200) sends the MCData-communication-state message to the originating MCData client device (100a) in response to receiving the MCData communication end request message from the controlling MCData server (100b), where the MCData-communication-state message comprises the terminate-request indication indicating that the request is to terminate MCData communication within the pre-established session.

At step-804, the participating MCData server (200) receives the acknowledgement message from the originating MCData client device (100a) in response to the MCData-communication-state. At step-805, the participating MCData server (200) sends the acknowledgement message to the controlling MCData server (100b) in response to receiving the acknowledgement message. At step-806, the participating MCData server (200) retains the at least one pre-established session with the originating MCData client device (100a).

According to sub-clause 9.2.5.4.1.2 of 3GPP TS 24.282: client terminating procedures of the Originating MCData client device (100a): upon receiving a SIP re-INVITE request within the pre-established session without an associated MCData session, the originating MCData client device (100a):
1) If the <mcdata-communication-state> element in the application/vnd.3gpp.mcdata-info+xml MIME body of the SIP INVITE request is set to a value of "terminate-request":
  i) Shall send SIP 200 (OK) response towards participating MCData server (200) according to 3GPP TS 24.229; and
  ii) Shall release all media plane resources corresponding to the MCData communication being released.

According to sub-clause 9.2.5.4.2.2 of 3GPP TS 24.282: terminating procedures of the participating MCData server (200): upon receiving a SIP BYE request from the controlling MCData server (100b), the participating MCData server (200):
1) Shall interact with the media plane as specified in 3GPP TS 24.582;
2) Shall send a SIP 200 (OK) response to the controlling MCData server (100b);
3) Shall generate a SIP re-INVITE request as specified in sub-clause 9.2.5.1.2 with following clarifications:
  i) Shall set the Request-URI to a public service identity identifying the pre-established session; and
  ii) Shall set the <mcdata-communication-state> element with a value of "terminate-request";
4) Shall send the SIP re-INVITE request towards the originating originating MCData client device (100a) according to 3GPP TS 24.229; and
4) Upon receipt of a SIP 2xx response to the SIP re-INVITE, shall interact with the media plane as specified in 3GPP TS 24.582.

The example embodiments disclosed herein can be implemented using at least one software program running on at least one hardware device and performing network management functions to control the elements.

The foregoing description of the specific example embodiments reveal the nature of those embodiments herein that others can, by applying current knowledge, readily modify and/or adapt for various applications such specific example embodiments without departing from the concepts disclosed, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the example embodiments as described herein.

We claim:

1. A method performed by a participating Mission Critical data (MCData) server, the method comprising:
  receiving, from an originating MCData client device, at least one session initiation protocol (SIP) INVITE request message, wherein the SIP INVITE request message comprises a pre-established session indication informing the participating MCData server of initiation of at least one pre-established session;
  initiating the at least one pre-established session with the originating MCData client device based on the pre-established session indication;
  receiving, from a controlling MCData server, at least one of an MCData communication session establishment successful message, an MCData communication session failure message, and an MCData communication session reject message;
  generating, after receiving the at least one of an MCData communication session establishment successful message, an MCData communication session failure message, and an MCData communication session reject message, a Re-INVITE request message including information associated with a MCData-communication-state within the at least one pre-established session; and
  transmitting, to the originating MCData client device, the Re-INVITE request message including the information.

2. The method as claimed in claim 1, further comprising:
  receiving, from the originating MCData client device, an acknowledgement message in response to the Re-INVITE request message, and
  wherein the information associated with the MCData-communication-state includes an establish-success indication indicating that the MCData communication is established successfully within the pre-established session, in case that the MCData communication session establishment successful message, and
  wherein the information associated with the MCData-communication-state includes an establish-fail indication indicating that the MCData communication is not established successfully within the pre-established session, in case that the MCData communication session failure message or the MCData communication session reject message.

3. The method as claimed in claim 1, wherein the information associated with the MCData-communication-state includes a terminated indication indicating that the MCData communication is terminated within the pre-established session.

4. The method as claimed in claim 1, wherein the information associated with the MCData-communication-state includes an establish-request indication to request establishment the MCData communication within the pre-established session, in case that a SIP invite request message is received.

5. The method as claimed in claim 1, wherein the information associated with the MCData-communication-state includes a terminate-request indication to terminate the MCData communication within the pre-established session.

6. A participating Mission Critical data (MCData) server, the participating MCData server comprising:
  a memory; and
  a processor, coupled with the memory, configured to:
  receive, from an originating MCData client device, at least one session initiation protocol (SIP) INVITE request message, wherein the SIP INVITE request message comprises a pre-established session indication informing the participating MCData server of initiation of at least one pre-established session,
  initiate the at least one pre-established session with the originating MCData client device based on the pre-established session indication,
  receive, from a controlling MCData server, at least one of an MCData communication session establishment successful message, an MCData communication session failure message, and an MCData communication session reject message,
  generate, after receipt of the at least one of an MCData communication session establishment successful message, an MCData communication session failure message, and an MCData communication session reject message, a Re-INVITE request message including information associated with a MCData-communication-state within the at least one pre-established session, and transmit, to the originating MCData client device, the Re-INVITE request message including the information.

7. The participating MCData server as claimed in claim 6, wherein the processor is further configured to:

receive, from the originating MCData client device, an acknowledgement message in response to the Re-INVITE request message, wherein the information associated with the MCData-communication-state includes an establish-success indication indicating that the MCData communication is established successfully within the pre-established session, in case that the MCData communication session establishment successful message, and wherein the information associated with the MCData-communication-state includes an establish-fail indication indicating that the MCData communication is not established successfully within the pre-established session, in case that the MCData communication session failure message or the MCData communication session reject message.

8. The participating MCData server as claimed in claim 6, wherein the information associated with the MCData-communication-state includes a terminated indication indicating that the MCData communication is terminated within the pre-established session.

9. The participating MCData server as claimed in claim 6, wherein the information associated with the MCData-communication-state includes an establish-request indication to request establishment the MCData communication within the pre-established session, in case that a SIP invite request message is received.

10. The participating MCData server as claimed in claim 6, wherein the information associated with the MCData-communication-state includes a terminate-request indication to terminate the MCData communication within the pre-established session.

* * * * *